United States Patent Office 3,230,529
Patented Jan. 18, 1966

3,230,529
MOVING TARGETS ELECTROMAGNETIC
DETECTION SYSTEMS
Hervé Tanter, Villebon-sur-Yvette, and Gérard Marie Edouard van den Broek, Versailles, France, assignors, by mesne assignments, to International Standard Electric Corporation, New York, N.Y., a corporation of Delaware
Filed Aug. 31, 1959, Ser. No. 837,283
2 Claims. (Cl. 343—13)

In the patent application of the present applicants, Serial No. 837,284, filed August 31, 1959, is described a radar system for the detection of moving targets. In that application signals obtained at the output of the coherent radar receiver are distributed to several identical channels, five in the particular embodiment described, in order to increase the information speed of the system. Information obtained at the output of each channel is applied respectively to five display oscilloscopes that must be looked at simultaneously. Such a display arrangement has the drawback that several operators are needed for taking advantage of the increased information speed of the system.

One object of the invention is to avoid the above mentioned drawback by displaying on the same oscilloscope the information obtained through the five channels.

To accomplish this object the invention features a circuit arrangement which permits the display of information from all of the channels on a single indicator device. This is accomplished by providing output as well as input gating devices for each channel. The input and output gates are operated simultaneously in each channel, but are timed to successively open the successive channels. The output gates are connected to a common lead line which serves to apply the signals to a common indicator. The indicator may be of the cathode ray type, which has a sweep frequency equal to the repetition rate of the radar pulses.

The invention will be particularly described with reference to the accompanying drawings in which:

FIGURE 6 illustrates a typical display of several moving targets on the indicator.

Figure 1:
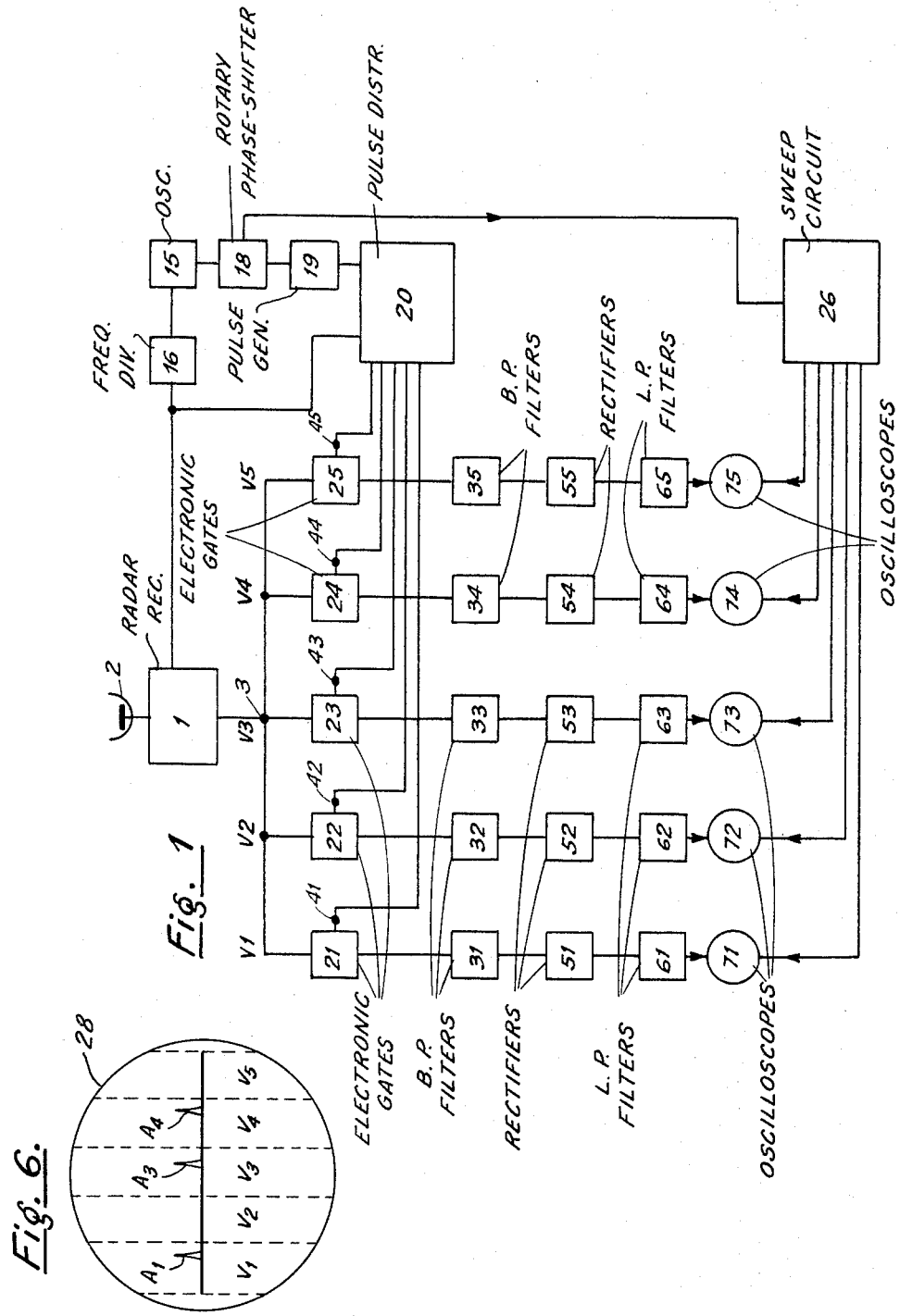
FIGURE 1 shows schematically a radar system similar to the one described in the above mentioned patent application.

The electromagnetic system for the detection of moving targets, object of the above mentioned patent application, will be briefly described in connection with FIGURE 1. In this figure, is shown in 1 a well known "coherent Doppler radar," represented with more details in FIGURE 1 of the above mentioned patent application. In such a system the coherence is obtained as outlined for example in "Reference Data for Radio Engineers," 4th edition, published by International Telephone and Telegraph Corporation, page 812. The common antenna 2 is used for transmission and reception and the output signal of the system appears at terminal 3. It is assumed that the system transmits pulses of 1 microsecond duration with a repetition frequency $F_r = 4$ kilocycles per second. As it has been explained in the above mentioned application, the signal obtained at the output terminal 3 resulting from the reflection of the transmitted pulses on stationary or moving targets are in the form of pulses having the same repetition rate as the one of the transmitted pulses. Said pulses have two characteristics: on the one hand their time position with respect to the transmitted pulses, characterizing the range of the stationary or moving target, and on the other hand their modulation that allows the separation of the signals received after reflection from moving targets from those received after reflection from stationary targets.

The signals obtained at the output terminal 3 are applied to five identical receiving channels V1, V2, V3, V4, V5 respectively through the electronic gates 21, 22, 23, 24, 25 each being provided with a control terminal 41, 42, 43, 44, 45. Each receiving channel comprises a pass band filter 31, 32, 33, 34, 35, called "Doppler" filter, that transmits only the component of the frequency spectrum of signals corresponding to moving targets, rectifier circuits 51, 52, 53, 54, 55 and low pass filters 61, 62, 63, 64, 65. Output signals of each channel are applied, as it is described and shown in FIGURE 5 of the above mentioned application, to five oscilloscopes 71, 72, 73, 74, 75.

The electronic gates are controlled by pulses produced by the generator shown at the right of FIGURE 1. This generator described in detail in the above mentioned application, comprises a reference stabilised oscillator 15 that controls a pulse generator 16 at the frequency $F_r = 4$ kc./s. in the embodiment shown. The output wave of the oscillator 15 is applied to a rotating phase shifter 18, the output signals which feed a pulse generator 19 operating at the frequency $n(F_r - f_e)$, $n$ being the number the number of receiving channels (5 in the example shown) and $f_e$ being of the order of 1 c./s. The output pulses of the circuits 16 and 19 are applied to a pulse distributor 20, that applies to the control terminals 41, 42, 43, 44, 45 pulses at the frequency $F_r - f_e$, respectively shifted in time by intervals of $$\frac{1}{5(F_r - f_e)}$$

Figure 2:
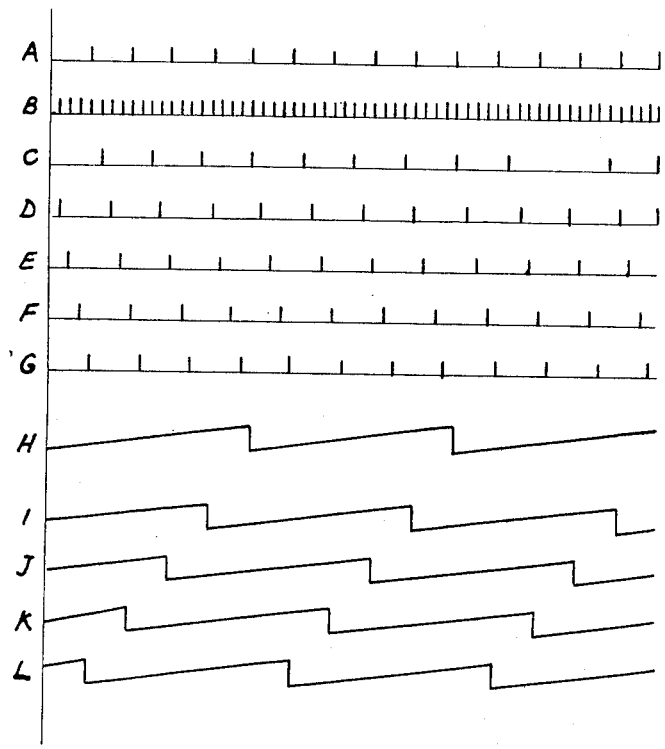
FIGURE 2 shows waveforms appearing at various points of the system shown in FIGURE 1.

In A, FIGURE 2, are shown the pulses of frequency $F_r$ obtained at the output of circuit 16 (FIGURE 1) and in B, the pulses at the frequency $n(F_r - f_e)$ ($n = 5$ in the example shown) obtained at the output of circuit 19 (FIGURE 1). In the embodiment shown $f_e$ (around 1 c./s.) is very small with respect to $F_r$ (4 kc./s.) but in order to make the drawing clear it has been assumed in FIGURE 2 that $F_r = 5f_e$. In C, D, E, F, G are shown the pulse trains with a frequency $F_r - f_e$ that are respectively applied to the control terminals 41, 42, 43, 44, 45 of the electronic gates 21, 22, 23, 24, 25 (FIGURE 1) by the pulse generator 20. In H, I, J, K, L are shown the sawtooth waves with a frequency $f_e$, that are used for controlling the horizontal sweep of oscilloscopes 71, 72, 73, 74, 75. The waveforms shown in H, I, J, K, L are generated by the circuit 26 that can be of any well known type, and that is synchronized by the output signal of the rotating phase shifter 18.

As it has been explained in the above mentioned application, there is obtained at the output terminal of the Doppler filters 31, 32, 33, 34, 35 (FIGURE 1) a sinusoidal waveform the frequency of which is a function of the radial speed of the moving target which causes it. These signals are rectified and filtered, so that a signal is obtained at the output of each channel, the position of which with respect to the sweep period $f_e$ characterizes the range of the moving target.

Figure 3:
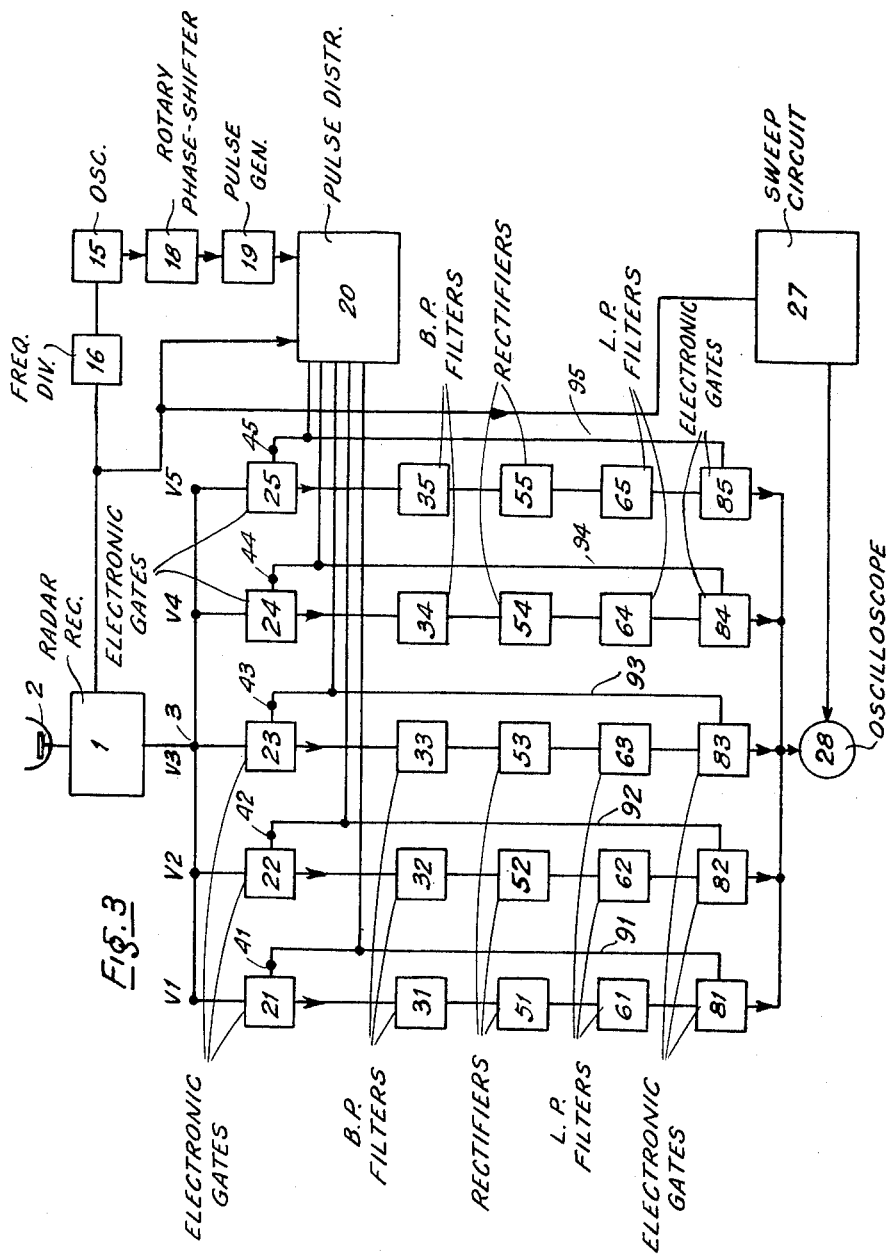
FIGURE 3 shows part of the system of FIGURE 1 modified according to the invention.

FIGURE 3 shows modification of FIGURE 1 according to the invention. In FIGURE 3 the circuits having the same functions as the ones shown in FIGURE 1 have been indicated by the same numerical references. The output signals of channels V1, V2, V3, V4, V5 are applied respectively to the input terminals of the electronic gates 81, 82, 83, 84, 85, of the same type as electronic gates 21, 22, 23, 24, 25 and that are controlled by the same pulse trains shown respectively in C, D, E, F, G, FIGURE 2, as it is indicated by the connections 91, 92, 93, 94, 95 (FIGURE 3).

The signals obtained at the output of electronic gates 81, 82, 83, 84, 85 are fed in parallel as control signal for the vertical deviation of the oscilloscope 28. The horizontal sweep of the oscilloscope 28 is controlled by sawtooth signals at the repetition frequency $F_r$ produced by a suitable generator 27 (FIGURE 3) synchronised by the output pulse of the generator 16.

Figure 4:
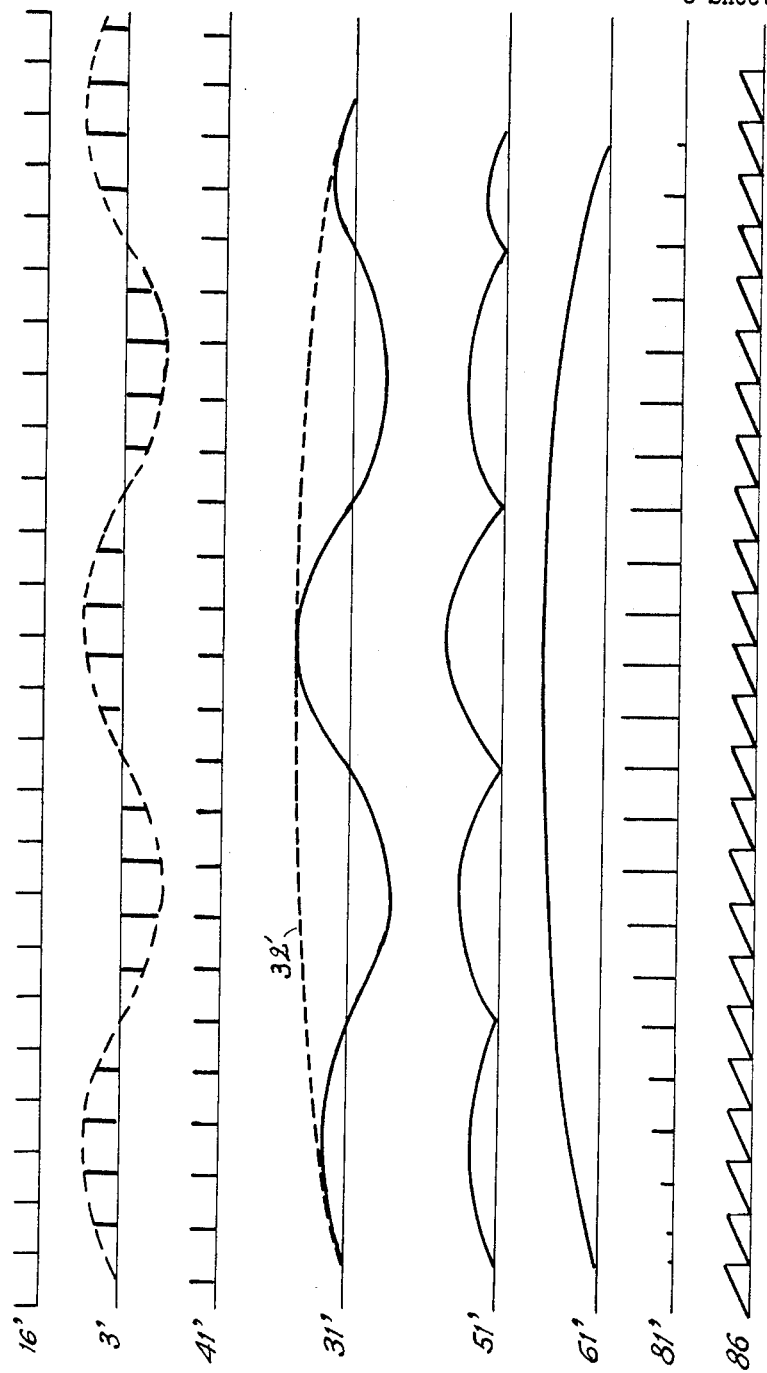
FIGURE 4 shows waveforms at various points of the system represented in FIGURE 3.

The operation of the system will be now explained in connection with FIGURE 4 showing the waveforms in various points of a channel: channel V1 for example. In this example there is shown only a part of a period $1/f_e$, to the time interval during which the control pulse applied to terminal 41 of the electronic gate 21 corresponds to signals obtained after reflection on a moving target. To simplify the drawing it has been assumed in FIGURE 4 that twenty successive control pulses are applied to the electronic gate during the signal corresponding to the moving target; however it is well understood that practically $f_e$ is much smaller than $F_r$, as it has been explained above, so many more will actually occur. In FIGURE 4, is shown in 16' the pulse train of frequency $F_r$, and in 3' the signals received after reflection on a moving target. As the receiver is part of a coherent radar system the signals from moving targets are pulses having the same duration as the pulses 16' (FIGURE 4), their repetition frequency is $F_r$ and they are amplitude modulated at the Doppler frequency. In 41' are shown the control pulses of the electronic gate 21, their repetition frequency is $F_r - f_e$. At the output of the Doppler filter 31 (FIGURE 3) is obtained a sinusoidal wave 31', amplitude modulated due to the relative displacement of the control pulses applied to the gates 21 to 25 with respect to the received pulses and this during the interval of time during which the control pulse 41' is in coincidence with the received signal. The envelope of this signal is shown by the dotted line 32'. The sinusoidal signal is rectified and this results in signal 51' which after filtering gives at the output of the channel V1 a signal such as indicated by the numerical reference 61. At the output of the electronic gate 81 appears a pulse such as 81', each time the control pulse 41' is in coincidence with the reception of a signal obtained after reflection on a moving target. The pulses obtained at the output of the electronic switch 81 have a repetition frequency $F_r$ and their time position with respect to the transmitted pulses 16' characterizes the range of the moving target due to the fact that time position of pulse 81' is identical to the time position of pulse 21' that corresponds to the signal received after reflection on a moving target.

Pulses 81' are applied to the vertical deviation electrodes of oscilloscope 28 (FIGURE 3). A sawtooth signal 86 of frequency $F_r$ is applied to the horizontal deviation electrodes of the oscilloscope. This sawtooth signal is produced by a conventional generator 27 synchronised by the output pulse of the generator 16.

In the above description, only the signals obtained through channel V1 have been considered, but it is clear that similar signals are obtained from channels V2, V3, V4 and V5, the control pulses of the electronic gates being respectively delayed of $$\frac{f_r - f_e}{5}, \ 2\left(\frac{f_r - f_e}{5}\right), \ 3\left(\frac{f_r - f_e}{5}\right) \text{ and } 4\left(\frac{f_r - f_e}{5}\right)$$

and these signals are applied in parallel successively to the vertical deviation electrodes of the oscilloscope 28.

Figure 5:
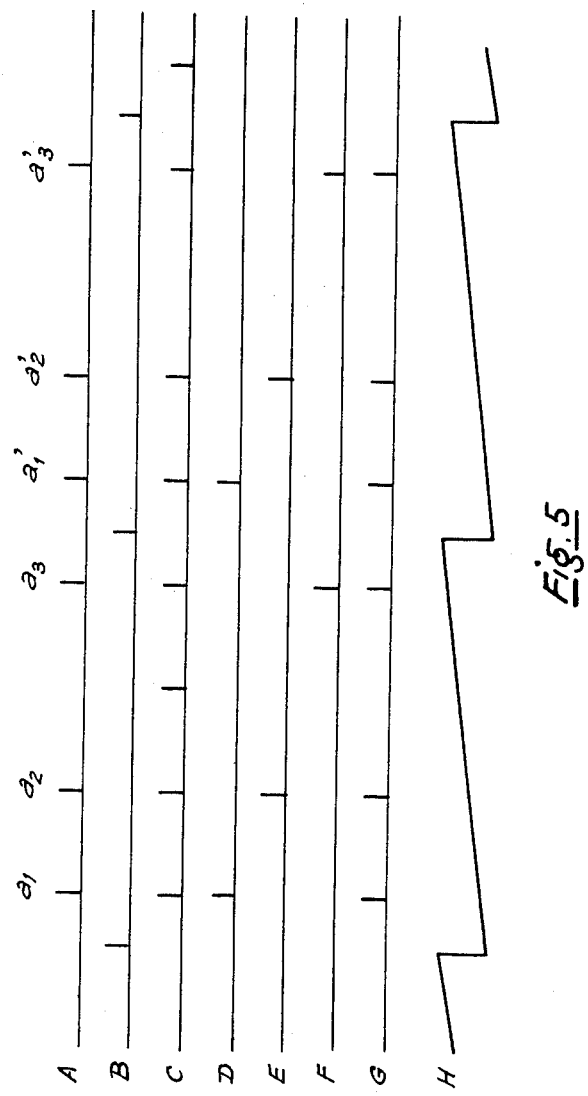
FIGURE 5 shows waveforms at various points of the system of FIGURE 3 when more than one moving target is detected simultaneously.

In FIGURE 5, the case of three moving targets detected in the same direction are shown. The signals corresponding to the moving targets have been indicated in A: as $a1, a2, a3$, during a first interval $1/F_r$, and $a'1, a'2, a'3$ during the following interval $1/F_r$. In B are shown the pulses at the frequency $F_r$ and in C, the pulses at the frequency $5(F_r - f_e)$. The signals obtained at the output of the electronic switches 81, 82, 84 corresponding to the channels V1, V2, V4 have been shown in D, E, F respectively, and the signals applied to the vertical deviation electrodes of oscilloscope 97 have been shown in G, the sweep signal being shown in H. Three spots representing respectively the targets corresponding to signals $a1, a2$ and $a3$ are obtained on the oscilloscope, the position of said spots with respect to the beginning of the switch being proportional to the range of the moving targets.

In FIGURE 6 is shown a typical display in A scope form showing three moving targets $A_1, A_3$ and $A_4$. The oscilloscope face is shown divided by the dash lines into sections wherein displays from each of the channels V1 through V5 are to be noted.

The first moving target is at such a range that it appears at a time gate 81 FIG. 3, is opened and is shown at $A_1$. The second and third moving targets are at a range such that they appear when gates 83 and 84 are opened and are displayed at $A_3$ and $A_4$, respectively.

In the embodiment described a type A display has been considered and it has been assumed that the antenna aims at a fixed direction. Practically, the antenna is rotated in order to scan a given area, and in such a case the oscilloscope system is modified in order to display simultaneously all the spots corresponding to the moving targets in the scanned area. A type B oscilloscope display may be used, for example, in which signals are applied to a control grid, and the vertical deflectors are operated by a signal synchronized with the antenna rotation.. Such systems are well known in the art and they can be readily applied to the invention.

While the principles of the above invention have been described in connection with specific embodiments and particular modifications thereof it is to be clearly understood that this description is made by way of example and not as a limitation of the scope of the invention.

What we claim is:

1. A device for sampling periodic signals of repetition frequency $F_r$ comprising in combination, means for sampling said signals at a frequency $n(F_r - f_e)$, where $n$ is an integer and $f_e$ is a frequency low with respect to $F_r$, the duration of each sampling period being small with respect to $$\frac{1}{n(F_r - f_e)}$$

means for applying said sampled signals successively and cyclically to $n$ channels where information not related to the time position of said signals within the repetition period are extracted, means for sampling said signals obtained at the output of each channel at a frequency $(F_r - f_e)$ in synchronism with the first above mentioned sampling, means for interleaving the sampled signals so obtained at the output of said $n$ channels, an oscilloscope display device the sweep frequency of which is $F_r$ and means for applying said interleaved signals to said oscilloscope.

2. An indicator system for producing an indication of return echoes from moving targets in the field of a radar transmitter operating at a first pulse repetition rate, wherein the return echo signals are applied to a plurality of parallel channels, each channel comprising in tandem a first gate circuit, a band-pass filter having a pass-band below the frequency of said first repetition rate to pass only signals from the moving targets, and a second gate circuit, a gating pulse generator producing pulses at a second repetition rate differing from said first repetition rate by a given fraction thereof, means for applying said gating pulses simultaneously to the first and second gates of a given channel, distributor means to assure successively timed application of said gating pulses to the gating circuits of successive of said channels, an indicator, means to apply to said indicator a sweep voltage of a frequency equal to said first repetition rate, and means for applying the outputs of said second gate circuits to said indicator, to provide an indication of the distance of said moving targets.

References Cited by the Examiner
UNITED STATES PATENTS

| | | | |
|---|---|---|---|
| 2,741,762 | 4/1956 | Page | 343—13 |
| 2,995,742 | 8/1961 | Braden | 343—11 |

CHESTER L. JUSTUS, *Primary Examiner.*

FREDERICK M. STRADER, *Examiner.*